(12) United States Patent
Chilton

(10) Patent No.: US 7,001,440 B1
(45) Date of Patent: Feb. 21, 2006

(54) FLUID FILTER ASSEMBLY WITH A FIN ARRAY

(75) Inventor: Donald Troy Chilton, Gastonia, NC (US)

(73) Assignee: Wix Filtration Corp., Gastonia, NC (US)

( * ) Notice: Subject to any disclaimer, the term of this patent is extended or adjusted under 35 U.S.C. 154(b) by 114 days.

(21) Appl. No.: 10/638,442

(22) Filed: Aug. 12, 2003

(51) Int. Cl.
*B01D 45/12* (2006.01)
*B01D 50/00* (2006.01)

(52) U.S. Cl. .......................... 55/337; 55/457; 55/498; 55/502; 55/510

(58) Field of Classification Search ................ 55/337, 55/418, 457, 498, 502, 510; 210/437, 454, 210/456
See application file for complete search history.

(56) References Cited

U.S. PATENT DOCUMENTS

| | | | |
|---|---|---|---|
| 3,078,650 A | 2/1963 | Anderson et al. | |
| 3,508,383 A | 4/1970 | Humbert, Jr. et al. | |
| 4,020,783 A | 5/1977 | Anderson et al. | |
| 4,141,700 A | 2/1979 | Norton, Jr. et al. | |
| 4,162,905 A | 7/1979 | Schuler | |
| 6,423,225 B1 | 7/2002 | Wong et al. | |
| 6,843,377 B1 * | 1/2005 | Roll | 210/437 |

* cited by examiner

*Primary Examiner*—Robert A. Hopkins
(74) *Attorney, Agent, or Firm*—Berenato, White & Stavish

(57) ABSTRACT

An air filter element includes an annular filter media having an end cap with an elongated sleeve portion having a unitary array of canted fins and a unitary annular disk partially closing one end. The end cap is preferably made of high impact polypropylene. An annular gasket made of foam rubber or polyurethane is adhered to the unitary annular disk portion, preferably by a two shot molding step.

16 Claims, 3 Drawing Sheets

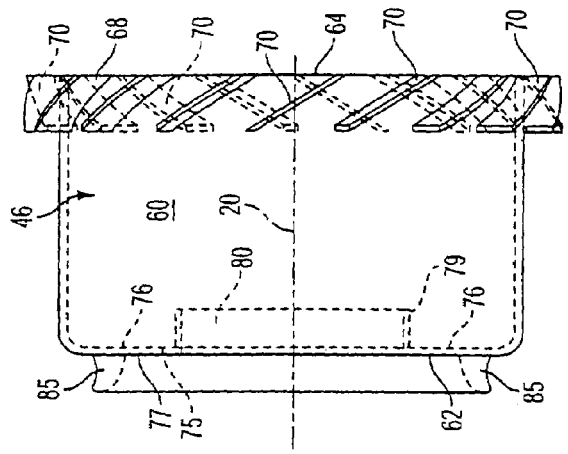
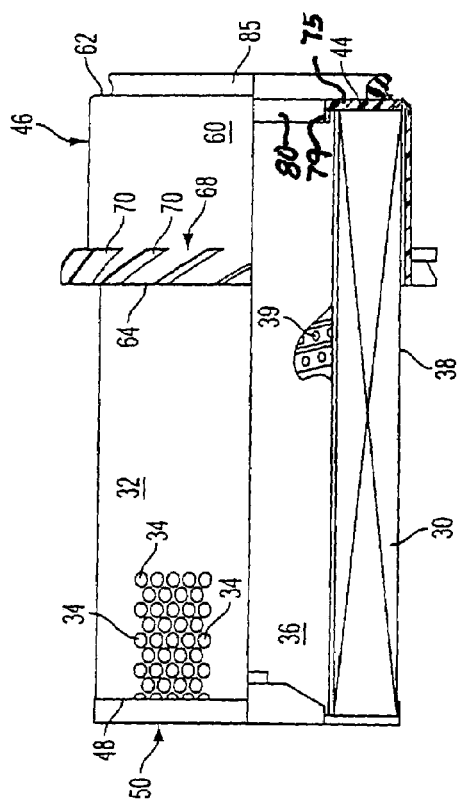
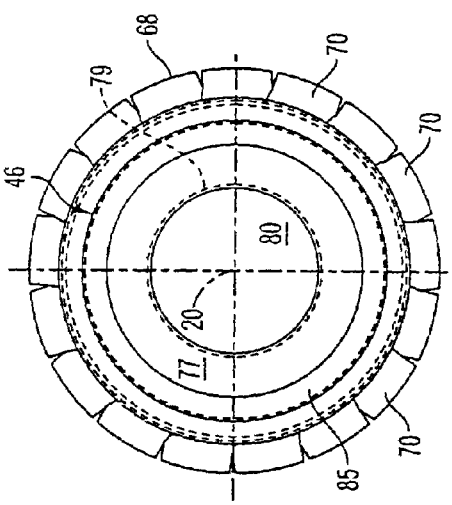

FLUID FILTER ASSEMBLY WITH A FIN ARRAY

FIELD OF THE INVENTION

The present invention relates to fluid filter elements with fin arrays. More particularly, the present invention relates to fluid filter components with fin arrays wherein the fin arrays are in association with an end cap.

BACKGROUND OF THE INVENTION

Fluid filters are widely used in machinery, such as but not limited to internal combustion engines, for filtering various fluids. It has been found that it is highly desirable to provide an even flow distribution of particles into filter media, which increases the filter media capacity and the life of a filter media while reducing the space consumed by the filter media. One way to address this is to provide, annular filter elements having an array of fins which encourage mixing of contaminated inlet air in order to promote an increase in capacity and efficiency.

In providing annular filters with fin arrays, there is a need to improve production efficiencies while providing improvements to consumers. There is also a constant need to maintain reliability while improving production efficiency.

SUMMARY OF THE INVENTION

In accordance with the present invention a fluid filter includes an annular filter media adapted for enclosure in a housing having a fluid inlet and a fluid outlet. The annular filter media has a first end and a second end, as well an outer dirty side surface and an inner clean side surface. The first end cap has an annular sleeve portion with the first and second ends. The annular sleeve portion and the second end both have an inside diameter which complements the outside diameter of the annular filter media. The first end portion is partially enclosed by a radially extending annular end cap portion having a width substantially the same as that of the first end of the filter media, which first end of the filter media is within the sleeve and covers the first end of the filter media. An array of fins extends radially outward from the sleeve, the fins being of the same polymer material as, and being unitary with the sleeve. An annular sealing gasket of a compressible or flexible material is molded to the annular disk and extends in the direction of the axis of the annular filter media. In a further aspect of the invention, the annular sealing gasket is made of foam rubber or silicon while the annular sleeve portion and an array of fins are molded of polypropylene copolymer.

In still a further aspect of the invention the filter element is used as an air filter element for internal combustion engines.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a partial elevation of the filter element of FIG. 1;

FIG. 3 is a side view with portions illustrated in phantom of filter element end cap used with the filter element shown in FIGS. 1 and 2;

FIG. 4 is a first end view of the end cap of FIG. 3;

DETAILED DESCRIPTION

Figure 1:
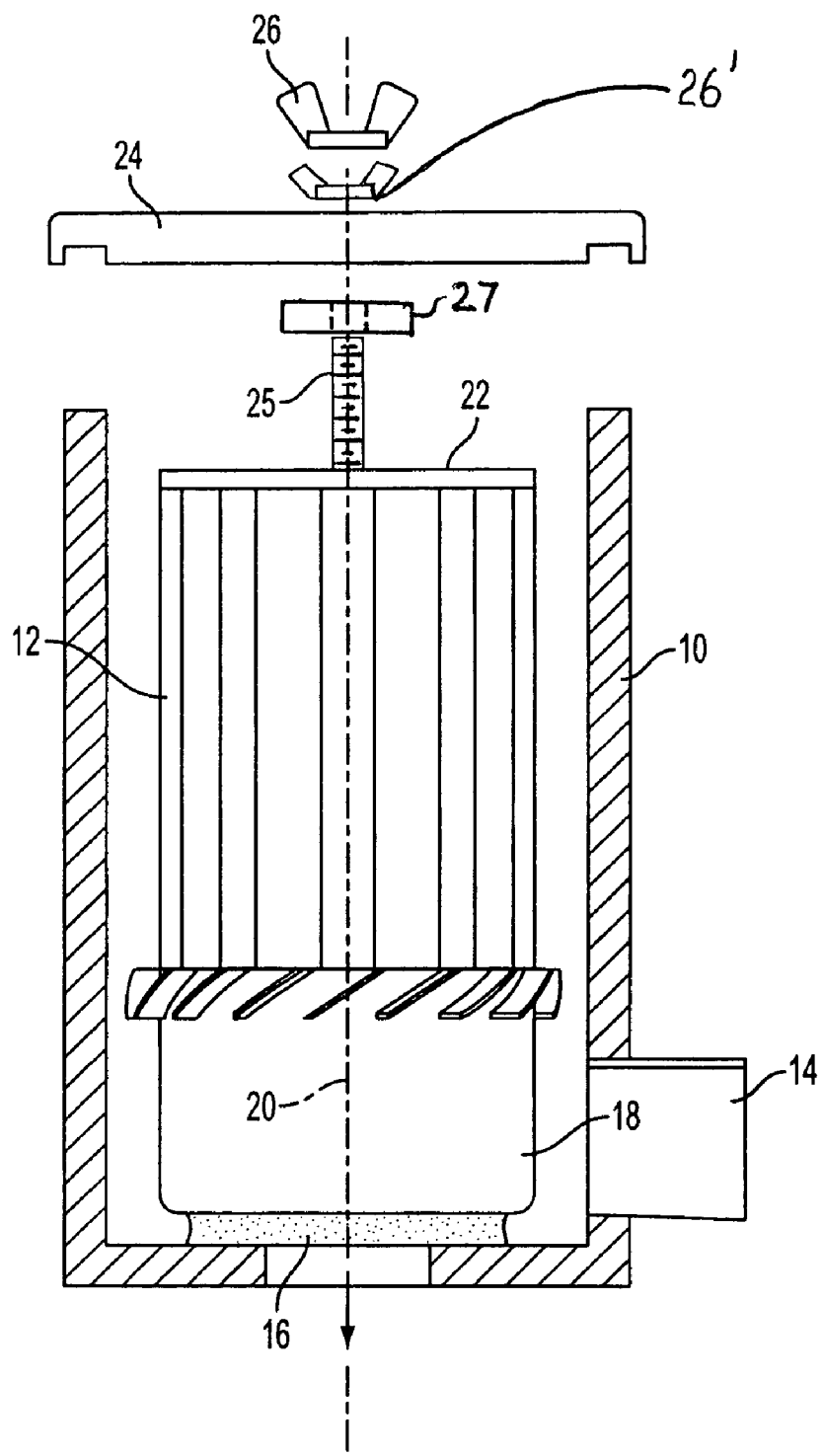
FIG. 1 is a side perspective view partially in elevation of a filter element configured in accordance with the present invention disposed within a filter housing.

Referring now to FIG. 1 there is shown filter housing 10 which houses a filter element 12 configured in accordance with the principles of the present invention. The filter housing 10 includes an air inlet 14 and an air outlet 16. Filter element 12 is disposed between the air inlet 14 and air outlet 16 and removes particulate matter from inlet air so that when the inlet air is used as combustion air for an internal combustion engine, the particulates are not introduced into the engine where they can damage the engine. The air inlet 14 is disposed adjacent to a first end 18 of the filter element 12 and is drawn through the filter element by low pressure at the engine outlet 16. The filter element 12 is supported within the housing 10 and has a sealed engagement with the outlet 16 in the direction of axis 20.

At a second end 22 of the filter element 12, a housing lid 24 is retained on a threaded stud 25 by a nut 26. A washer 27 which is coaxial with the threaded stud 25, exerts an axial force between the lid 24 and second end 22 of the filter element 12 to hold the first end 18 of the filter element sealed around the outlet opening 16.

Referring now to FIG. 2 in combination with FIG. 1, it is seen that the filter element 12 is comprised of an annular filter media 30, preferably in the form of pleated filter paper. The annular filter media 30 is covered on the outside by a perforated outer sleeve 32 that has holes 34 therethrough so that dirty outside air passes through the perforated outer sleeve into the annular pleated filter media. The outer sleeve 32 can also be expanded metal, or optionally, not used at all. The annular filter media 30 defines a hollow core 36 which is lined with an inner spiral tube 38 having holes 39 therethrough allowing filtered clean air to enter the hollow core. Rather than an inner spiral tube 38, a perforated inner sleeve or expanded metal inner sleeve may be employed. Optionally, no inner tube or sleeve is used. The outer sleeve 32 and inner spiral tube 38 cooperate to provide a relatively rigid support for the pleated paper media 30.

Figure 6:
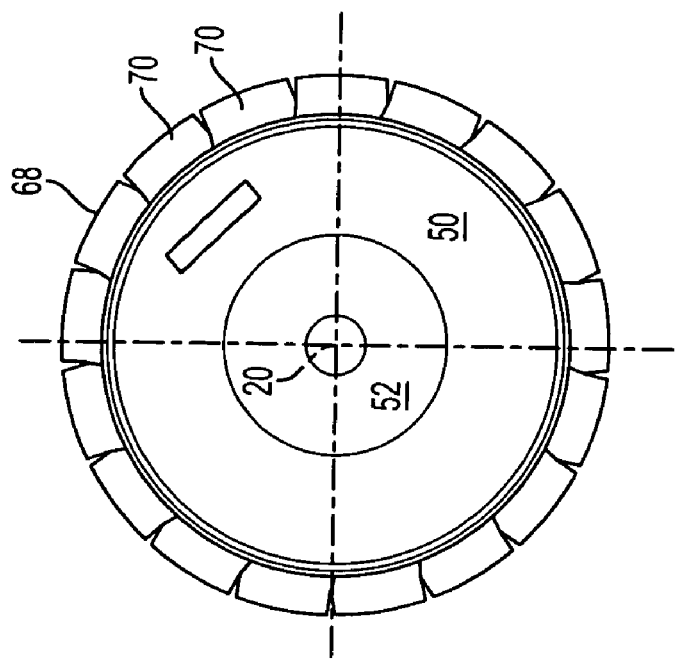
FIG. 6 is a second end view a of closed end cap closing the filter element of FIGS. 1 and 2.

The filter media 30 is closed at a first annular end 44 by a first, annular end cap 46 and at a second annular end 48 by second annular end cap 50. The second annular end cap 50 completely closes one end of the hollow core 36 and has an indentation 52 (see FIG. 6) therein in which the washer 27 is seated to hold the filter element 12 against the end of the filter housing 10 around the circular outlet opening 16 (see FIG. 1) this is accomplished by using another nut 26.

As is seen in FIGS. 3 and 4, the first end cap 46 is a single piece comprising sleeve portion 60 of an axial length which is a substantial portion of the axial length of the annular filter element 30 in the direction of axis 20. For example, the sleeve portion 60 has an axial length of about 3 to about 4 inches while the filter element has an axial length of about 11 inches. The sleeve portion 60 has first end 62 disposed adjacent the first end 44 of the annular filter media 30 when the first end cap 46 is slid over the annular filter media and a second end 64 which has an inner diameter that complements the outer diameter of the inside surface of the perforated metal sleeve 32 (FIG. 2), so that the sleeve portion 60 fits snugly over the filter media 30. Unitary with the end cap 46, is a fin array 68 comprising a plurality of canted fins 70. The array 68 of fins 70 is axially spaced from the first end 62 of the first end cap 46 at the second end 64 thereof. Preferably, the sleeve portion 60 and fin array 68 are molded from polypropylene, or another plastic material such as a polyamide material (NYLON®), to form the unitary sleeve portion 46 which includes the fin array 68.

Integral with the sleeve portion 60 and the fin array 68 is an annular end disk portion 75. The annular disk portion 75 has an inner surface 76 and an exterior surface 77. Projecting inwardly from the inner surface 76 is an annular lip 79 that defines an opening 80 that is aligned with the air outlet opening 16 of the housing 10 when the filter element 12 is mounted in the housing. The lip 79 extends over a short inner portion of the filter media 30 and inner spiral tube 38 when the first end cap 46 is mounted over the filter media. A layer of plastisol, or other sealing material such as urethane, is disposed between the bottom surface 76 of the annular disk portion 75 and the first end 44 of filter media 30 in order to adhere and seal the annular disk portion to the first end of the filter media.

Figure 5:
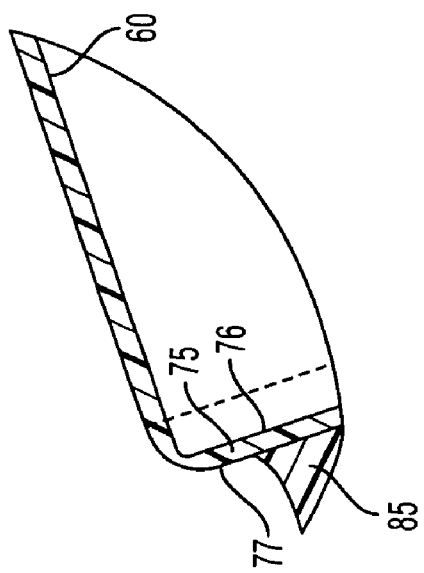
FIG. 5 is enlarged elevation of a portion of an end cap shown in FIGS. 3 and 4.

As seen in FIG. 5 as well as FIGS. 1–4, an annular gasket 85 projects from the outer surface 77 of the annular disk 75 for sealing with the inside of the housing 10 adjacent to the opening 16. The annular gasket 85 is made of either an open cell foam, such as a foam rubber composition, so as to be compressible, or is made of polyurethane, so as to be flexible. The gasket 85 is either glued to the surface 77 of the annular disk portion 75 or is co-molded therewith using a two shot molding process in which gasket material is shot into the mold onto previously shot material for the sleeve portion 60 and fin array 68. Alternatively, the material for the gasket 85 is shot first and the material for the sleeve portion 60 and fin array 68 is shot against the molded material of the gasket 85. In either case, as the shot material cures, the gasket 85 adheres to the surface 77 of the annular disk portion 75 that is unitary or a single piece with the sleeve portion 60.

The sleeve portion 60, with the unitary fin array 68, disk 75 and attached gasket 85 are secured as a unitary annular end cap over the perforated outer sleeve 32 with an adhesive such as an epoxy adhesive.

From the foregoing description, one skilled in the art can easily ascertain the essential characteristics of this invention, and without departing form the spirit and scope thereof, can make various changes and modifications of the invention to adapt it to various usages and conditions.

We claim:

1. A filter for removing particulate matter from air, comprising:
   an annular filter media disposed in a housing having an air inlet in a side of said housing and an air outlet in an end of said housing;
   the annular filter media having a first end and a second end defining a longitudinal axis, and an outer dirty side surface of a first diameter and an inner clean side surface of a second diameter circumscribing said longitudinal axis;
   a first end cap having an annular sleeve portion with first and second ends, the annular sleeve portion circumscribing said longitudinal axis, the first end of the sleeve portion being partially closed by a radially extending annular disk;
   an array of fins extending radially outward from the sleeve portion; and
   an annular gasket of a compressible or flexible gasket material affixed to the annular disk portion, extending in the direction of the longitudinal axis, and provided to seal with the outlet of the housing,
   wherein said air inlet faces said annular sleeve portion to direct air in a direction orthogonal to said longitudinal axis.

2. The fluid filter of claim 1 wherein the annular disk portion of the first end cap includes an annular lip extending axially into the hollow core of the filter media for overlapping a portion of the filter media adjacent to the first end thereof.

3. The fluid filter of claim 2 further comprising an adhesive sealant at least between the annular disk portion and the first end of the filter media.

4. The fluid filter of claim 3 wherein the array of fins are disposed in a ring adjacent to the second end of the sleeve.

5. The fluid filter of claim 4 wherein the first end cap is a molding made of polypropylene copolymer.

6. The fluid filter of claim 5 wherein the annular sealing gasket is made of foam rubber or silicon.

7. The fluid filter of claim 3 wherein the annular sealing gasket is made of foam rubber or silicon.

8. The fluid filter of claim 1 wherein the unitary end cap is a molding made of polypropylene copolymer.

9. The fluid filter of claim 8 wherein the annular sealing gasket is made of foam rubber or silicon.

10. The fluid filter of claim 1 wherein the annular disk portion includes an annular lip extending axially into the hollow core of the filter media for overlapping a portion of the filter media adjacent to the first end thereof.

11. The fluid filter of claim 2 further comprising a potting compound comprised of plastisol or urethane between the end cap portion and the first end of the filter media.

12. The fluid filter of claim 3 wherein the array of fins are disposed in a ring adjacent the second end of the sleeve.

13. The fluid filter of claim 1 wherein the annular gasket is molded on the annular disk.

14. The fluid filter of claim 1 wherein the annular gasket is glued to the annular disk.

15. The fluid filter of claim 1 wherein the annular gasket is co-molded with the annular disk.

16. An air filter element comprising:
   an annular filter media adapted for enclosure in a housing having an air inlet and an air outlet;
   the annular filter media having a first end and a second end defining a longitudinal axis, and an outer dirty side surface of a first diameter and an inner clean side surface of a second diameter circumscribing said longitudinal axis;
   an end cap molded of a high impact polypropylene copolymer, the end cap having an annular sleeve portion circumscribing said longitudinal axis with first and second ends, the sleeve portion and the second end thereof having an inside diameter which complements the outside diameter of the annular filter media, the first end of said sleeve portion being partially closed by a radially extending annular disk portion unitary with the annular sleeve portion and having a width substantially the same as that of the first end of the filter media, the first end of the sleeve portion covers the first end of the filter media;

an array of fins extending radially outward from the sleeve portion, the fins being made of high impact polypropylene and being unitary with the sleeve portion; and an annular gasket of one of foam rubber gasket material and silicon material co-molded with the annular disk and extending in the direction of the axis, the annular gasket provided to seal with the outlet of the housing, wherein said air inlet faces said annular sleeve portion to direct air in a direction orthogonal to said longitudinal axis.

* * * * *